(12) United States Patent
Fukushima et al.

(10) Patent No.: US 7,036,205 B2
(45) Date of Patent: May 2, 2006

(54) METHOD OF MANUFACTURING STATOR FOR BRUSHLESS MOTORS

(75) Inventors: Shinji Fukushima, Ehime (JP); Kazuei Yagi, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 283 days.

(21) Appl. No.: 10/374,891

(22) Filed: Feb. 25, 2003

(65) Prior Publication Data

US 2003/0146672 A1    Aug. 7, 2003

Related U.S. Application Data

(63) Continuation of application No. 09/424,551, filed as application No. PCT/JP99/01384 on Mar. 19, 1999, now abandoned.

(30) Foreign Application Priority Data

Mar. 25, 1998 (JP) .................... 10-077060

(51) Int. Cl.
*H02K 15/00* (2006.01)
*H01F 7/08* (2006.01)

(52) U.S. Cl. ............... 29/596; 29/606; 29/412; 29/417; 310/193; 310/156.32; 310/268

(58) Field of Classification Search ............... 29/596, 29/598, 606, 846, 412, 417; 310/81, 10, 310/193, 156.32, 156.33, 156.34, 156.35, 310/156.36, 156.37, 268, DIG. 6
See application file for complete search history.

(56) References Cited

U.S. PATENT DOCUMENTS

| | | | |
|---|---|---|---|
| 3,482,131 A | | 12/1969 | Lytle |
| 3,534,469 A | * | 10/1970 | Keogh .................... 29/598 |
| 3,696,258 A | * | 10/1972 | Anderson et al. ........ 310/10 X |
| 4,115,915 A | * | 9/1978 | Godfrey .................. 29/596 |
| 4,488,075 A | | 12/1984 | DeCesare |

(Continued)

FOREIGN PATENT DOCUMENTS

| | | | |
|---|---|---|---|
| JP | 58-29362 | * | 2/1983 |
| JP | 59-2561 | | 1/1984 |
| JP | 03-190585 | | 8/1991 |
| JP | 09-322503 | | 12/1997 |

OTHER PUBLICATIONS

Austrian Search Report (with Written Opinion) for application No. 9905470-2, dated Jun. 29, 2001.

(Continued)

*Primary Examiner*—A. Dexter Tugbang

(74) *Attorney, Agent, or Firm*—RatnerPrestia

(57) ABSTRACT

A plurality of motors are assembled. A plurality of part-sized stators are provided. Each of the part-sized stators is a split portion of a full-sized stator which has been previously split. The full-sized stator includes a printed circuit board with a plurality of coils. Each part-sized stator is inserted into a respective motor.

5 Claims, 5 Drawing Sheets

U.S. PATENT DOCUMENTS

| | | |
|---|---|---|
| 4,677,332 A * | 6/1987 | Heyraud ............ 310/DIG. 6 X |
| 4,939,400 A | 7/1990 | Matsushita et al. |
| 4,987,333 A | 1/1991 | Noguchi et al. |
| 5,038,062 A | 8/1991 | Shiraki |
| 5,289,069 A | 2/1994 | Hasegawa et al. |
| 5,619,087 A | 4/1997 | Sakai |
| 5,644,183 A | 7/1997 | Van Loenan et al. |
| 5,837,948 A | 11/1998 | Aulanko et al. |

OTHER PUBLICATIONS

"Electric Motors and Motor Controls" Jeff Keljik, Delmar Publishers, 1995 p. 139.

* cited by examiner

METHOD OF MANUFACTURING STATOR FOR BRUSHLESS MOTORS

THIS APPLICATION IS A CONTINUATION OF U.S. patent application Ser. No. 09/424,551 FILED JAN. 5, 2000 (abandoned) WHICH IS A NATIONAL PHASE OF PCT/JP99/01384 filed Mar. 19, 1999.

TECHNICAL FIELD

The present invention relates to a brushless motor and a manufacturing method of the same, and more particularly, relates to an arrangement of coils thereof.

BACKGROUND ART

Brushless motors demand a greater torque per unit-current (expressed with the motor constant "Kt") in order to obtain a higher power with a small body. For this purpose, in a conventional motor, coils are generally arranged to occupy an area not less than the area a permanent magnet occupies so that a number of coils—represented by S—in each phase becomes greater. However, in a case of arranging number of flat air-core coils on a printed circuit board, the increasing of number "S" incurs a higher manufacturing cost as well as more steps of processing. As a result, expensive brushless motors of a poor productivity are effected in many cases.

It has been known that a brushless motor conventionally having a stator employing "S" pieces of coils in each phase functions properly with only S/N pieces of coils in each phase. (Both "N" and "S/N" are integers.) Accordingly, it is well understood that reduction of a number of coils decreases a cost of components. However, when a total number of 3×S/N pieces of coils—where each phase includes S/N pieces of coils—are arranged around a rotary shaft with approximate equal spaces in between, there is a need to build another manufacturing apparatus for mounting coils to a printed circuit board which makes up a stator together with the coils. This requires expensive cost of apparatus and blocks the mass-production of low cost brushless motors.

FIGS. 4(a) and 4(b) are a cross sectional view and a perspective view of a conventional brushless motor. In the cross section of FIG. 4(a), total of 6 coils, i.e. a number of phases is 3, and coil No. 1–3 in each phase ×2, are fixedly mounted to printed circuit board 24 so that the coils face disc-shaped rotor 8 including a permanent magnet magnetized in number of polarities. On another side of the coils 1–3, flat-disc-shaped yoke 28 made of soft magnet material and coaxial with the permanent magnet is arranged for converging the magnetic flux travelling from the permanent magnet. Yoke 28 occupies an area not less than the area the permanent magnet occupies, and integrates with printed circuit board 24 which forms the stator. Screws 13 fix yoke 28 and printed circuit board 24 together to chassis 12.

The perspective view of FIG. 4(b) illustrates a brushless motor viewed from disc-shaped rotor 8 perspectively through respective components. Coils 1–3 are arranged in the entire circumference of the rotor so that the arranged places of coils correspond to the location of the permanent magnet. Printed circuit board 24 occupies an area not less than the area the coils occupy, and covers the entire circumference.

FIG. 2 illustrates a machine for bonding coils to a printed circuit board, this machine is one of appratuses for manufacturing the brushless motor discussed above. Numbers of jig bases 15 are mounted to the rim of rotary table 14. The cross section of FIG. 5(b) illustrates a status where coils 1–3 and printed circuit board 24 are mounted to jig bases 15 on the machine. The perspective view of FIG. 5(a) illustrates the same status shown in FIG. 5(b) viewed from the side of printed circuit board 24 perspectively through respective components.

In FIG. 2, some dozens of jig bases 15 are arranged on the rim of rotary table 14, and outside of the rim, stator-take-out-machine 16, coil-mounter 17, gluing machine 18 and printed-circuit-board-mounter 19 are arranged closely with each other in this order in the rotating direction of rotary table 14. From printed-circuit-board-mounter 19 to stator-take-out-machine 16, enough space is reserved. The rotation of rotary table 14 allows jig base 15 sequentially to call at stator-take-out-machine 16, coil mounter 17, gluing machine 18 and printed-circuit-board-mounter 19, and respective machines do their assigned jobs when they are called by jig base 15.

First, coil-mounter 17 mounts two sets of coils 1–3, namely total 6 coils, onto jig base 15. Second, gluing machine 18 applies enough glue to upper faces of each coil so that every coil is covered by the glue. Third, printed-circuit-board-mounter 19 mounts printed-circuit-board 24 onto the coils covered by the glue, then printed-circuit-board 24 and coils 1–3—both are set on jib-base 15 as well as pressed—are forwarded to stator-take-out-machine 16 whereby both are bonded by enough strength. Just before the stator-take-out-machine 16, the pressure applied to the coils and printed-circuit-board on jib-base 15 is released, then machine 16 takes out a stator formed of coils and printed circuit board. Vacant jig-base 15 is then forwarded to coil-mounter 17, and another cycle of process starts. Through the cycle of process discussed above, one jig-base 15 produces one stator, and jig-base 15 repeatedly rotates so that the stators are manufactured in volume.

In the brushless motor shown in FIG. 4, disc-shaped rotor 8 having a permanent magnet rotates with regard to yoke 28 fixed to chassis 12, thereby producing eddy-current-loss. Further, disc-shaped rotor 8 with a permanent magnet is attracted to yoke 28 fixed to chassis 12 by magnetic attraction whereby thrust receptor member 23 is urged to thrust bearing member 22. Meanwhile thrust bearing member 22 is provided to bearing 21 which supports shaft 20 disposed in disc-shaped rotor 8 mounted to chassis 12, and thrust receptor member 23 is provided on disc-shaped rotor 8. This urging pressure produces sliding friction between members 22 and 23. The eddy-current-loss and sliding-friction discussed above produce torque loss so that the brushless motor cannot deliver its proper torque. When a brushless motor is designed, this torque loss due to the eddy-current-loss and sliding-friction should be taken into consideration and therefore a greater torque must be built in the motor. For instance, a number of coils or turns of coil is increased, or an outer diameter and thickness of a motor is enlarged; however, these measures generally boost the cost. This is remarkably noticed in the brushless motor for a high speed spinning among others.

If a conventional brushless motor is streamlined by reducing a number of coils, conventional equipment including a coil bonding machine cannot be used anymore, and the depreciation cost thus increases the cost. This blocks lowering the cost of the brushless motor.

Further, a number of turns of coil in each phase is reduced thereby lowering the motor torque.

SUMMARY OF THE INVENTION

A brushless motor of the present invention addresses the problems discussed above, and its coils are arranged symmetrically with regard to a shaft of a disc-shaped rotor. Further, an apparatus which manufactures stators of the brushless motor—the stator comprising a pair of coils electrically coupled—is employed to manufacture N pieces of stators in one shot, where a number of coils in each phase is S/N (N is an integer equal to or more than 2, and S/N is an integer), and all the components making up the stator including coils are arranged within an area spanning 360/N degree with regard to a rotary shaft of the disc-shaped rotor.

A method of manufacturing the brushless motor of the present invention comprises the steps of:

(a) fixing a plurality of coils on a printed-circuit-board in an annular shape with equal intervals with regard to the rotary shaft of the motor;

(b) dividing the printed-circuit-board along split lines running through the rotary shaft into a plurality of sub-boards; and (c) using respective sub-boards as stators.

"N" times of stators are produced so that brushless motors with stators at a 1/N cost can be manufactured.

In an exemplary embodiment including a brushless motor where a stator including multi-phase flat-air-core-coils faces a disc-shaped rotor including a permanent magnet having numbers of pairs of polarities, respective components making up the stator are arranged within an area spanning 360/N degree with regard to a rotary shaft of the disc-shaped rotor (N is an integer equal to or more than 2.) As a result, the costs of components including coils and making up the stator can be reduced.

In an exemplary embodiment, coils of each phase have "S" pieces of flat-air-core-coils (S is an integer equal to or more than 2) and are arranged symmetrically with regard to a shaft of a disc-shaped rotor. Further, the apparatus which manufactures stators of the brushless motor—the stator comprising a pair of coils electrically coupled—is employed to manufacture N pieces of stators in one shot, where a number of coils in each phase is S/N (N is an integer equal to or more than 2, and S/N is an integer), and all the components making up the stator including coils are arranged within an area spanning 360/N degree with regard to a rotary shaft of the disc-shaped rotor. As a result, no additional investment for manufacturing apparatus is involved, and yet, "N" times productivity and a 1/N cost of the conventional method can be embodied in the stators.

In an exemplary embodiment, in the brushless motor having a stator with flat-air-core coils in multi-phases—where the stator faces a disc-shaped rotor having a permanent magnet with numbers of pairs of polarities—a number of turns of coil is increased so that a total resisting value of S pieces of coils in each phase equals to a total resisting value of coils—the number of coils is reduced to 1/N. Yet, a flat disc made of soft magnetic material and having an area equal to or more than the area the permanent magnet occupies—the flat disc being disposed on a first side of the coil and being coaxial with the rotor—is synchronously rotated with the disc-shaped rotor having the permanent magnet with numbers of pairs of polarities on a second side of the coil. A number of coils is thus reduced to 1/N, thereby retarding the deterioration of motor's characteristics.

In an exemplary embodiment, in the brushless motor having a stator with flat-air-core coils in multi-phases—where the stator faces a disc-shaped rotor having a permanent magnet with numbers of pairs of polarities—the coils are coupled to a printed circuit board at a sticking out section of the board, which sticks out from the range spanning 360/N degree with regard to a rotary shaft of the disc-shaped rotor, and the board has a recessed section corresponding to the sticking out section. This arrangement avoids a case where N pieces of stators cannot be put in the manufacturing apparatus due to little space because soldering coils' terminals and the like occupies greater space.

In an exemplary embodiment, a method of manufacturing brushless motors comprise the following elements:

a disc-shaped rotor having a permanent magnet with numbers of pairs of polarities; and a stator having a plurality of coils forming multi-phase-windings fixedly arranged on a printed circuit board with equal intervals.

The method comprises the steps below:

arranging fixedly a plurality of coils on the printed circuit board with equal intervals so that the coils form a ring around a quasi motor-rotation-center;

dividing the printed circuit board into a plurality of sub-printed circuit boards along split-lines running through the center; and using respective sub-boards as the stators.

According to this method, productivity increases to "N" times comparing with a conventional method, and manufacturing cost decreases.

In an exemplary embodiment, a land for coupling is formed on a section stuck out from the printed circuit board, the section is formed by the split-line—non-straight-line—running through the quasi motor-rotation-center. The spilt line has been formed on the printed circuit board with a mechanical strength lower than other parts of the board, and the board is split along this split line. Coils are bonded to N pieces of stators, and then the printed circuit board is split thereby increasing the productivity.

In an exemplary embodiment, the coils are fixedly arranged with equal intervals on the printed circuit board so that the coils form a ring around the quasi motor-rotation-center, where the board has been already split into a plurality of sub-boards, and the sub-boards are mated with each other. After the coils are bonded to the board, the board is split again into sub-boards. The respective sub-boards are used as the stators. As a result, the productivity increases to N times comparing with the conventional method.

DETAILED DESCRIPTION OF THE PREFERRED EXEMPLARY EMBODIMENTS

Exemplary Embodiment 1

Figure 1A:
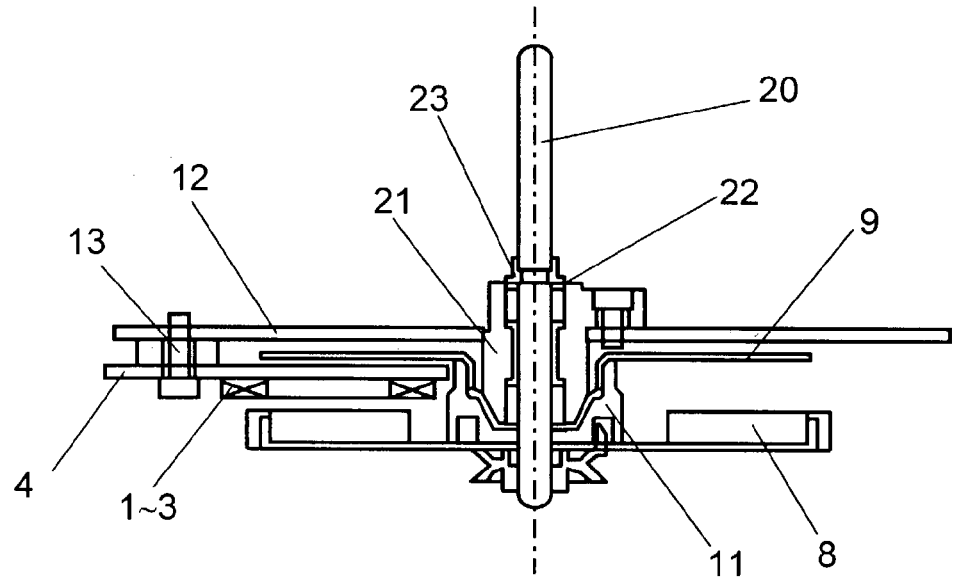
FIG. 1(a) is a cross section of a brushless motor in accordance with a first and a second exemplary embodiment.
Figure 1B:
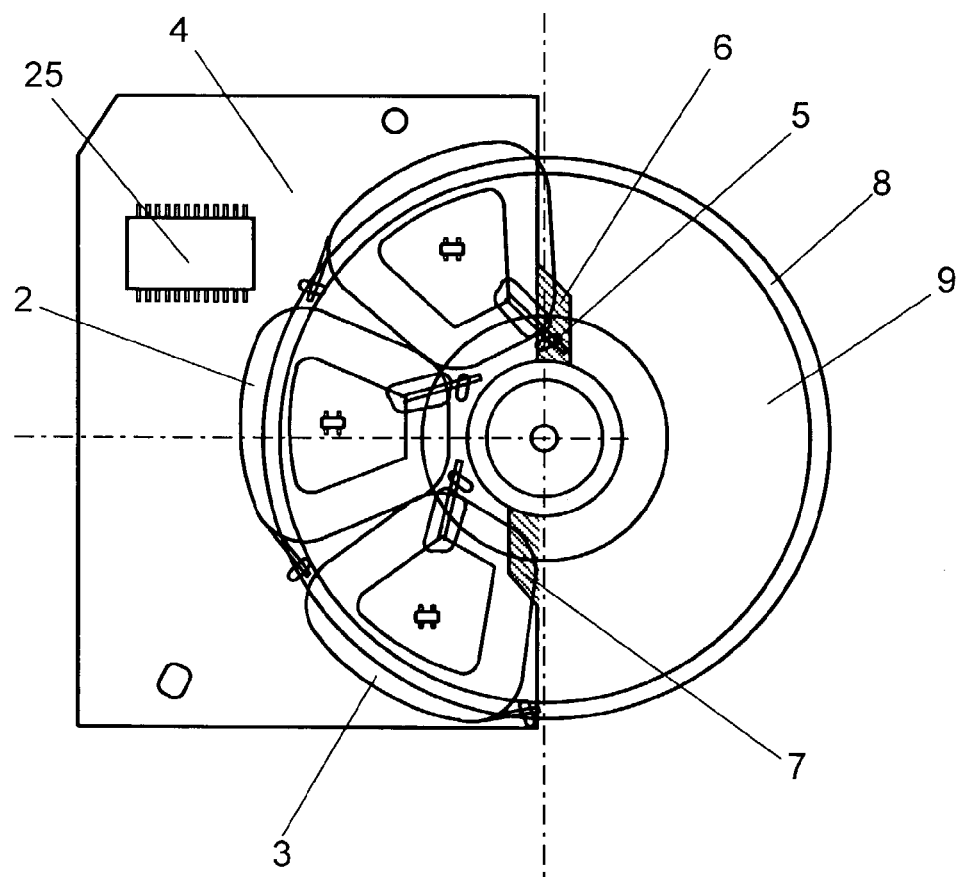
FIG. 1(b) is a perspective view of the brushless motor in accordance with the first and second exemplary embodiments.

FIG. 1(a) and FIG. 1(b) are a cross section and a perspective view of a brushless motor of the present invention. In the cross section of FIG. 1(a), disc-shaped rotor 8 having a permanent magnet faces printed-circuit-board 4 on which coils 1–3 of respective 3 phases, i.e. total 3 pieces of coils, are bonded. On the other side of the coils, disc-shaped yoke 9 made of soft magnetic material is arranged. Yoke 9 is coaxial with disc-shaped rotor 8 and has an area equal to or more than the area the permanent magnet occupies.

The perspective view of FIG. 1(b) illustrates the brushless motor of the present invention viewed from disc-shaped rotor 8 perspectively through respective components. Coils 1–3 and printed circuit board 4 are arranged within an area spanning 180 degree with regard to a rotary shaft. The area corresponds to the permanent magnet spanning 180 degree with regard to the rotary shaft, and the remaining space is vacant.

Figure 2:
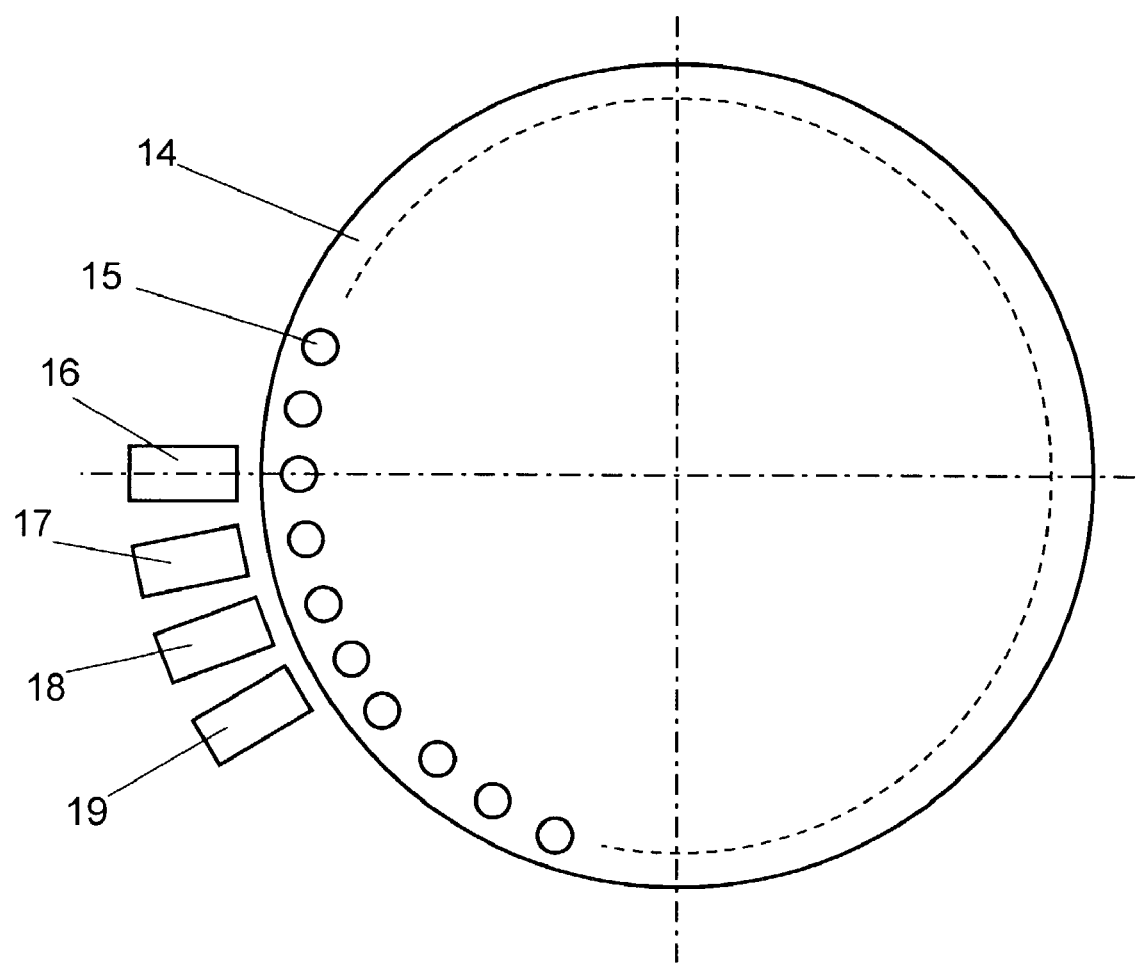
FIG. 2 illustrates an apparatus of manufacturing the brushless motor in accordance with the first exemplary embodiment.

FIG. 2 illustrates the apparatus for manufacturing a stator comprising the coils and the printed circuit board. This apparatus has been used for manufacturing a brushless motor comprising a printed-circuit-board on which each two pieces of coils 1–3 of respective conventional 3 phases, i.e. total 6 coils, are bonded. As a result, the productivity increases to twice as much as the conventional method.

In FIG. 2, some dozens of jig bases 15 are arranged on the rim of rotary table 14, and outside of the rim, stator-take-out-machine 16, coil-mounter 17, gluing machine 18 and printed-circuit-board-mounter 19 are arranged closely with each other in this order in the rotating direction of rotary table 14. From printed-circuit-board-mounter 19 to stator-take-out-machine 16, enough space is reserved. The rotation of rotary table 14 allows jig base 15 sequentially to call at stator-take-out-machine 16, coil mounter 17, gluing machine 18 and printed-circuit-board-mounter 19, and respective machines do their assigned jobs when the are called by jig base 15.

First, coil-mounter 17 mounts two sets of coils 1–3, namely total 6 coils, onto jig base 15. Second, gluing machine 18 applies enough glue to upper faces of each coil so that every coil is covered by the glue. Third, printed-circuit-board-mounter 19 mounts 2 sheets of printed-circuit-board 4 onto the coils covered by the glue, then printed-circuit-boards 4 and coils 1–3—both are set on jib-base 15 as well as pressed—are forwarded to stator-take-out-machine 16 whereby both are bonded by enough strength. Just before the stator-take-out-machine 16, the pressure applied to coils and printed-circuit-board on jib-base 15 is released, then machine 16 takes out a stator formed of coils and printed circuit boards. Vacant jig-base 15 is then forwarded to coil-mounter 17, and another cycle of process starts. Through the cycle of process discussed above, one jig-base 15 produces two stators, and jig-base 15 repeatedly rotates so that the stators are manufactured in volume.

Figure 3A:
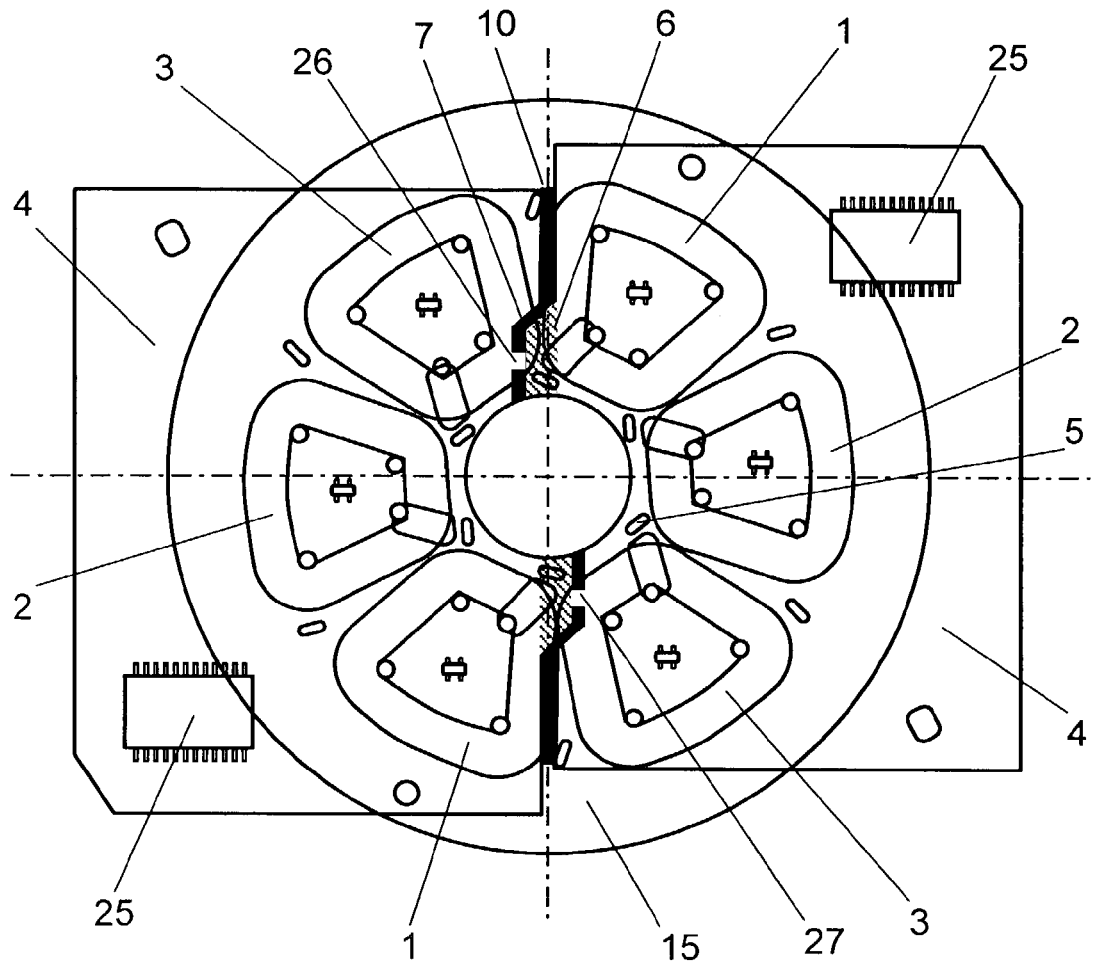
FIG. 3(a) is a perspective view illustrating the brushless motor used in the first embodiment is mounted to a jig base of the manufacturing apparatus.
Figure 3B:
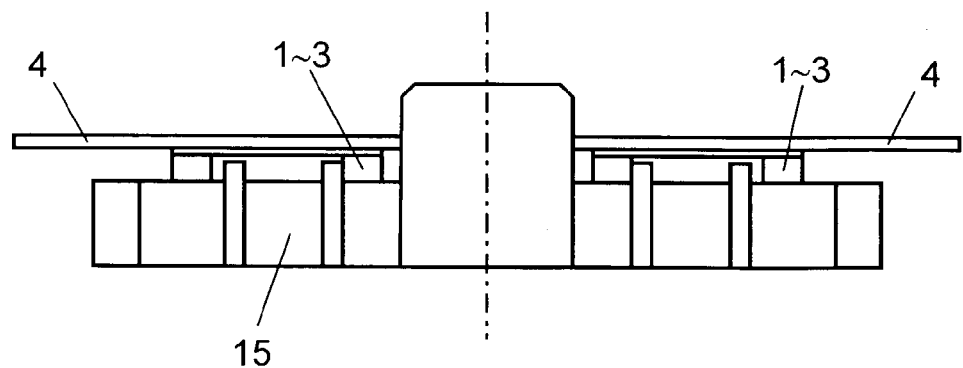
FIG. 3(b) is a cross section illustrating the brushless motor used in the first embodiment is mounted to the jig base of the manufacturing apparatus.
Figure 4A:
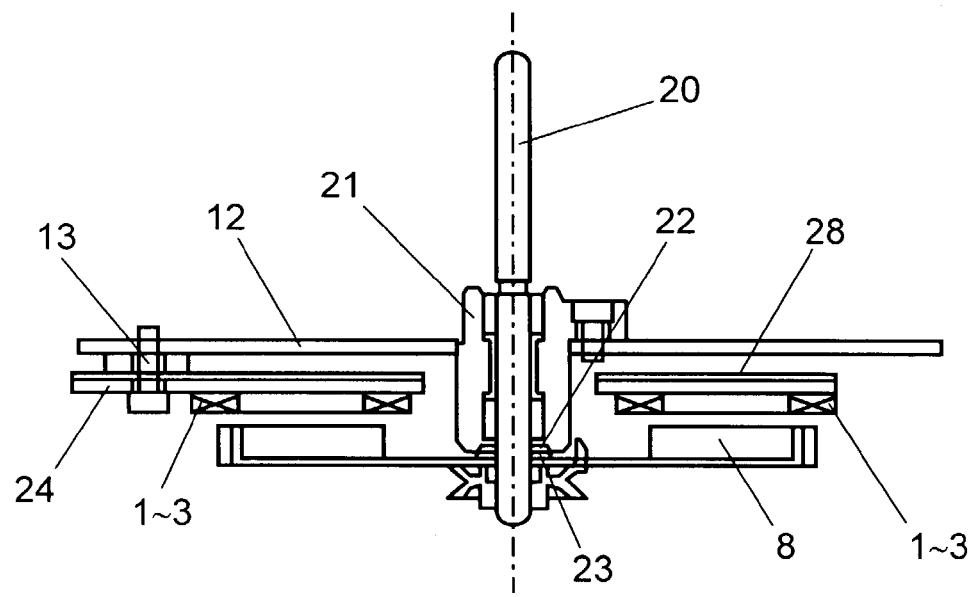
FIG. 4(a) is a cross section of a conventional brushless motor.
Figure 4B:
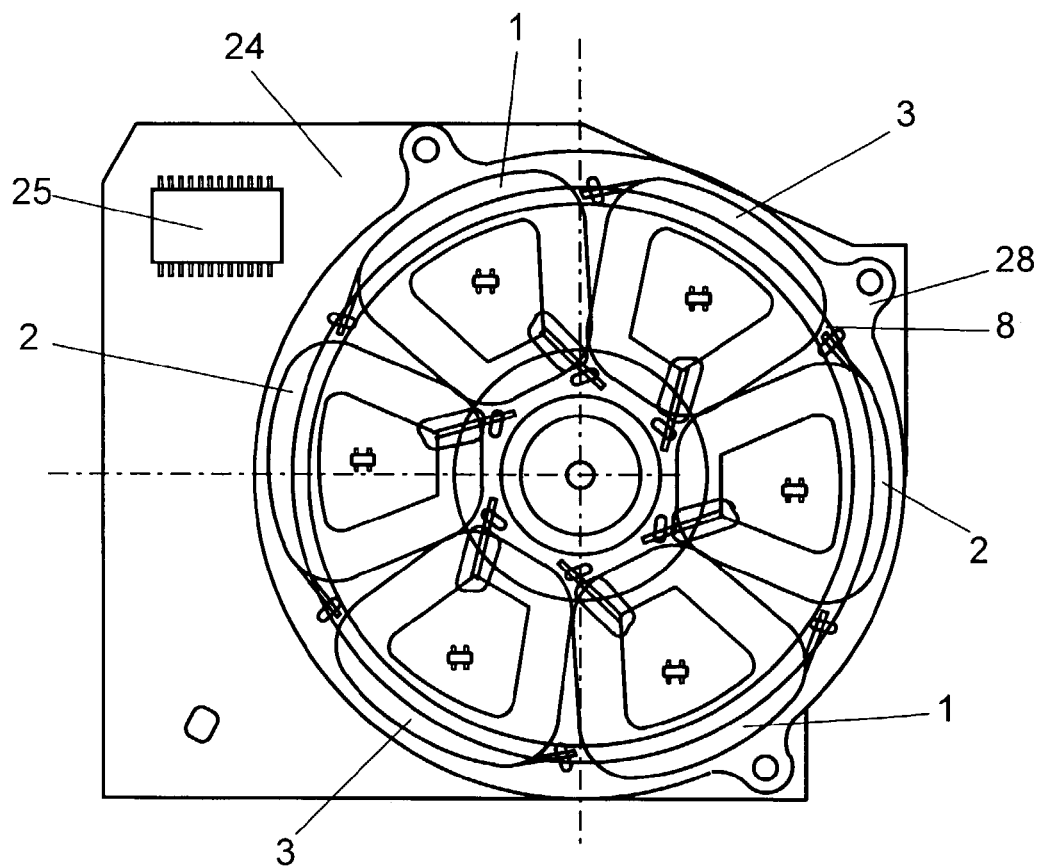
FIG. 4(b) is a perspective view of the conventional brushless motor.
Figure 5A:
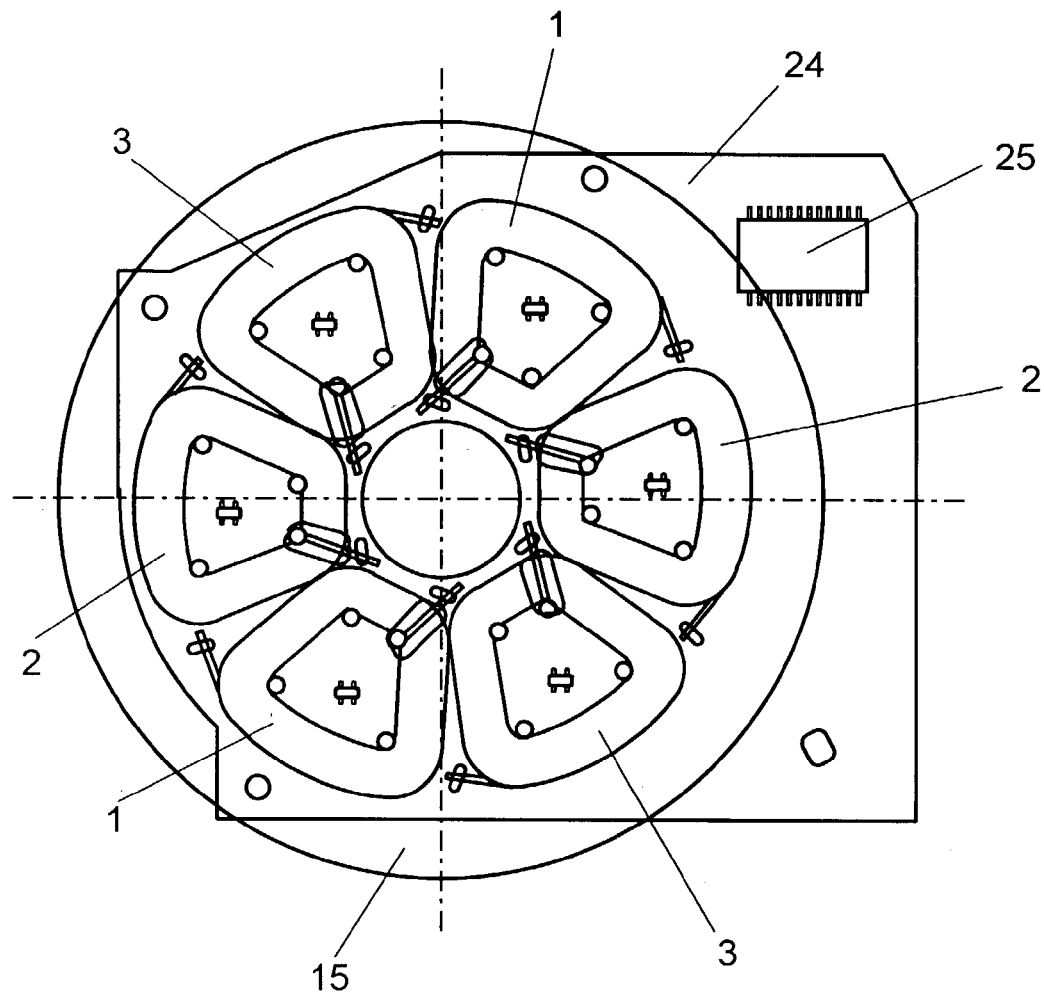
FIG. 5(a) is a perspective view illustrating the conventional brushless motor is mounted to the jig base of the manufacturing apparatus.
Figure 5B:
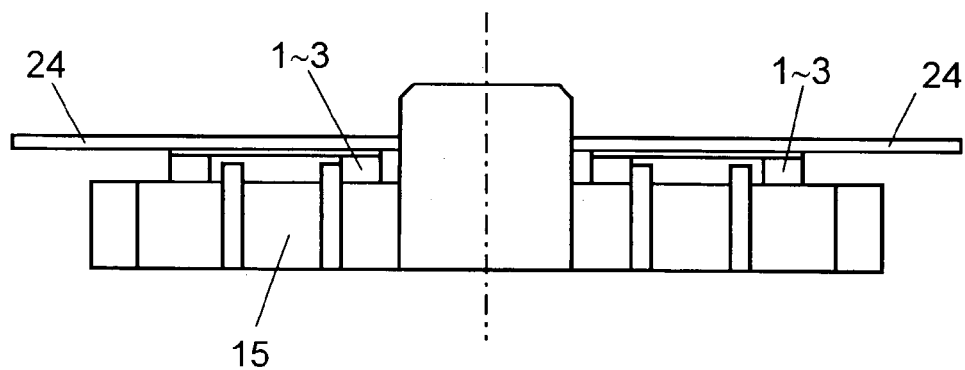
FIG. 5(b) is a cross section illustrating the conventional brushless motor is mounted to the jig base of the manufacturing apparatus.

FIG. 3 illustrates 2 sheets of sub-boards 4 as well as 6 pieces of coils, i.e. 2 each of coils 1–3 of respective 3 phases, are mounted to jig-base 15. The cross section of FIG. 3(a) illustrates coils 1–3 are mounted to jig base 15, and on top of that, sub-boards 4 are mounted. The perspective view of FIG. 3(b) views the status shown in FIG. 3(a) from the side of sub-boards 4 perspectively through respective components. Printed circuit board 4 is split into equal halves each spanning 180 degree with regard to a rotary shaft center. One half of the board is mounted on the 3 coils, i.e. coils 1–3, so that 2 sheets of sub-boards 4 can be mounted to jig-base 15. As a result, one jig base 15 can simultaneously produce two stators.

Two sheets of sub-boards 4 are mounted to jig base 15 with slit 10 of 1–2 mm width between the two sheets so that an operation efficiency of mounting boards 4 to jug base 15 improves.

Coupling sections 26 and 27 are provided in parts of the slit so that the two sub-boards can be handled as one board. For instance, total of 6 pieces coils, i.e. 2 each of coils 1–3 of respective 3 phases, are mounted to printed circuit board 4 by the bonding process discussed above, then coupling sections 26 and 27 provided on board 4 are separated so that board 4 is split into two sub-boards 4. As a result, this method manufactures two stators—one of which has three phases and each phase has one coil. Further, before the coils are bonded, a driving circuit including driver IC 25 is mounted so that a number of components mounted to the board increases. This method thus effects to raise a mount density.

In the perspective view of FIG. 1(b), printed circuit board 4 which has been split into two halves—spanning 180 degree with regard to the rotary shaft—sticks out into section 6. This stuck out section 6 is used as land 5 for soldering the terminals of coils 1–3 to printed circuit board 4. Stuck out section 6 and notch section 7 are shaped so that section 6 can mate with section 7. As a result, no printed circuit board is available in some parts underneath coil 3, and on the contrary, stuck out section 6 of another board is disposed under the same coil 3. If this condition would be brought into a conventional manufacturing process, coil 3 is not only bonded to printed circuit board 4, but also bonded to another printed circuit board 4 at the same time so that the two stators cannot be separated. It is thus required that parts of the glue applied to coil 3 be removed from notch section 7.

This removal of glue lowers the bonding strength of coil 3 substantially comparing with those of coil 1 and coil 2. In order to overcome this disadvantage, an area—where coil 3 is bonded and of which resist film is removed—is enlarged so that the bonding strength is prevented from being weak. The bonding strength between a coil and a printed circuit board is known for being improved by removing resist film provided on the printed circuit board. For obtaining this expected result, the wiring to be printed at the corresponding area should be moved to another place in order to avoid any problems due to the removal of the resist film.

Exemplary Embodiment 2

The same elements used in the first embodiment are denoted with the same marks, and their descriptions are omitted here.

In FIG. 1, disc-shaped yoke 9—made of soft magnetic material and coaxial with the rotor—is disposed on a first side of coils 1–3, and rotor 8 is on a second side of coils 1–3. Yoke 9 has an area equal to or wider than the area the permanent magnet occupies. The permanent magnet attracts disc-shape yoke 9, and holing member 11 supports yoke 9.

Printed circuit board 4 forming a stator is placed within an area spanning approximate 180 degree with regard to a rotary shaft of rotor 8 and includes coils 1, 2 and 3 assigned to respective 3 phases.

Being different from a conventional stator having two coils in each phase, the stator according to this invention has one coil in each phase. In the case when a number of turns of a coil and a thread diameter of the coil equal to those of a conventional coil, a total resisting value of respective phases is thus a half that of the conventional one. The coils of the brushless motor according to the present invention incur the decreasing of motor characteristics Kt due to decreasing the number of coils of each phase from 2 to 1. However, parts of this decreasing can be compensated by increasing a number of turns of a coil/phase until the coil resisting value reaches to the total resisting value of conventional two coils/phase. However, if the turns increases at the same thread diameter, the coil measurement grows larger thereby eventually enlarging the brushless motor. The thread diameter must be thus thinned appropriately.

For instance, a conventional coil of 0.29 mm thread diameter, 114 turns and 4.2 Ω/phase has motor characteristics Kt=0.56, while the coil used in the present invention of 0.24 mm thread diameter, 163 turns (increased by nearly 50%), and 4.4 Ω/phase (nearly equal) has motor characteristics Kt=0.40. It proves that the coil used in the present invention can suppress the decreasing of coil characteristics Kt at a small level.

Disc-shaped yoke 9 is attracted by the permanent magnet equipped in disc-shaped rotor 8, and supporting member 11 supports yoke 9 so that yoke 9 incorporates with rotor 8 and also rotates synchronously with rotor 8. As a result, little eddy-current-loss is produced. Further, supporting member 11 supports disc-shaped yoke 9 so that yoke 9 incorporates with rotor 8 having the permanent magnet, whereby almost all of magnetic attraction work between yoke 9 and rotor 8. The magnetic attraction thus does not work between chassis 12 and rotor 8.

As a result, the thrust force—working on thrust receptor members 22 and 23 disposed on bearing 21 fixed to chassis 12—is formed only by a self-weight of a rotary body of the brushless motor. The torque loss working between thrust receptor member 22 and 23—due to sliding friction caused by rotating the brushless motor—is also reduced. It is known that the sliding friction is proportional to a value of "a pressure applied to a slide member"×"a slide speed". The torque loss due to the sliding friction thus decreases at a lower pressure applied to the slide member. The methods discussed above can decrease the eddy-current-loss as well as the torque loss, thereby compensating the decreasing of motor characteristics Kt.

Next, the attraction and repulsion in the thrust direction work on rotor 8, and a degree of decreasing of this work is described hereinafter. The attraction and repulsion is produced by the magnetic flux of rotor 8 and the magnetic flux produced by powering the coils, thereby rotating the motor. The force of attraction and repulsion only in radial direction is utilized for rotating the motor, while the force in the thrust direction causes vibration of the motor. The influence of this attraction and repulsion in the thrust direction can be decreased by the following method: Arrange the coils of each phase approximately symmetric with regard to the rotary shaft, and arrange the same polarities of the coils so that the polarity of attraction and repulsion produced in the coils are the same. As a result, moment force working on rotor 8 is cancelled, and thus vibration of rotor 8 can be suppressed. However, according to the present invention, the coils cannot be arranged symmetrically with regard to the rotary shaft. Disc-shaped yoke 9 facing rotor 8 thus integrates therewith by supporting member 11. This lowers rigidity of stators free from being bonded with yoke comparing with the rigidity of a conventional stator bonded with a yoke made of a flat iron plate—the yoke is bonded to the printed circuit board. As a result, attraction and repulsion—available between coils 1–3 and rotor 8 and working on rotor 8—decreases its effect on rotor 8. In other words, if the attraction and repulsion between coils 1–3 and rotor 8 are the same in the conventional motor and that of the present invention, the stator of which rigidity relatively decreases incurs greater vibrations, and thus the vibration of rotor 8 decreases.

The methods discussed above can compensate most of the decreasing of motor characteristics Kt as well as suppress the vibration of rotor 8 due to decreasing a number of coils. The brushless motor of the present invention thus maintain the same characteristics as the conventional one. As a result, the present invention can provide a brushless motor which satisfies the characteristics the conventional one embodies, and can utilize the same manufacturing apparatus as the conventional one, and yet double the productivity.

INDUSTRIAL APPLICABILITY

As discussed previously, the brushless motor of the present invention can utilize a conventional manufacturing apparatus for stators, satisfy the characteristics of the conventional one, lower the cost for itself, and increase the productivity of manufacturing the brushless motors to N times.

The invention claimed is:

1. A method of assembling a plurality of motors comprising the steps of:
   (a) providing a plurality of stator sub-boards, each of the stator sub-boards being a split portion of a circuit board which has been previously split, the circuit board having a plurality of coils which are arranged in an annular shape on the printed circuit board around a center of motor rotation, said plurality of stator sub-boards formed by splitting the circuit board with the plurality of coils thereon along a split line running through the printed circuit board; and
   (b) inserting each of the stator sub-boards into a respective motor.

2. The method of claim 1 wherein step (a) includes arranging the plurality of coils with substantially equal spacing with respect to each other, and arranging the plurality of coils with substantially equal spacing with respect to the center of motor rotation.

3. The method of claim 1 wherein the split line is formed to have less mechanical strength than the remainder of the printed circuit board.

4. The method of claim 1 including the step of forming the split line to include a nonlinear section such that a land is formed at said nonlinear section after the step of splitting, the land for coupling to a terminal of at least one of said coils.

5. The method of claim 1 wherein step (a) includes providing each of the stator sub-boards to be a 180 degree portion of an annular-shaped full-sized stator.

* * * * *

UNITED STATES PATENT AND TRADEMARK OFFICE
CERTIFICATE OF CORRECTION

PATENT NO. : 7,036,205 B2  Page 1 of 1
APPLICATION NO. : 10/374891
DATED : May 2, 2006
INVENTOR(S) : Fukushima et al.

It is certified that error appears in the above-identified patent and that said Letters Patent is hereby corrected as shown below:

On the Title page, Item (63) the paragraph under Related U.S. Application Data should be replaced with the following paragraph:

--Continuation of U.S. patent application No. 09/424,551 filed, January 5, 2000 (abandoned), which is a National Phase of PCT/JP99/01384.--

Signed and Sealed this

Sixth Day of February, 2007

JON W. DUDAS
*Director of the United States Patent and Trademark Office*